(12) United States Patent
Callahan et al.

(10) Patent No.: US 11,203,415 B2
(45) Date of Patent: Dec. 21, 2021

(54) FLIGHT CONTROL CABLE SENSOR FOR AN AIRCRAFT

(71) Applicant: The Boeing Company, Chicago, IL (US)

(72) Inventors: Kevin S. Callahan, Shoreline, WA (US); Jeff Yoo, Bothell, WA (US)

(73) Assignee: The Boeing Company, Illinois (IL)

(*) Notice: Subject to any disclaimer, the term of this patent is extended or adjusted under 35 U.S.C. 154(b) by 575 days.

(21) Appl. No.: 16/212,648

(22) Filed: Dec. 6, 2018

(65) Prior Publication Data
US 2020/0180751 A1    Jun. 11, 2020

(51) Int. Cl.
| | |
|---|---|
| *B64F 5/60* | (2017.01) |
| *B64C 19/00* | (2006.01) |
| *G01D 3/08* | (2006.01) |
| *G01D 5/244* | (2006.01) |
| *B64D 45/00* | (2006.01) |
| *B64C 13/30* | (2006.01) |
| *G01D 5/12* | (2006.01) |
| *G01D 5/00* | (2006.01) |

(52) U.S. Cl.
CPC .............. *B64C 19/00* (2013.01); *B64C 13/30* (2013.01); *B64D 45/0005* (2013.01); *B64F 5/60* (2017.01); *G01D 3/08* (2013.01); *G01D 5/00* (2013.01); *G01D 5/12* (2013.01); *G01D 5/244* (2013.01); *G01D 5/24428* (2013.01); *G01D 5/24433* (2013.01); *G01D 5/24438* (2013.01); *G01D 5/24442* (2013.01)

(58) Field of Classification Search
CPC ........... B64C 19/00; B64C 13/30; B64F 5/60; G01D 3/08; G01D 5/00; G01D 5/12
See application file for complete search history.

(56) References Cited

U.S. PATENT DOCUMENTS

| | | | |
|---|---|---|---|
| 5,551,652 | A | 9/1996 | Verhoeven |
| 2011/0108671 | A1 | 5/2011 | Soronda |
| 2017/0274986 | A1* | 9/2017 | Huynh ................. B64C 13/507 |
| 2018/0002028 | A1 | 1/2018 | Polcuch |
| 2020/0094944 | A1* | 3/2020 | Callahan ............ B64D 45/0005 |

FOREIGN PATENT DOCUMENTS

EP          3223104          9/2017

OTHER PUBLICATIONS

Extended European Search Report for EP Patent Application No. 19210599.7 dated May 12, 2020.

* cited by examiner

*Primary Examiner* — Jamel E Williams
(74) *Attorney, Agent, or Firm* — Kunzler Bean & Adamson

(57) ABSTRACT

Disclosed herein is a flight control cable sensor for detecting actuation of a flight control cable of an aircraft. The flight control cable sensor comprises a draw wire encoder, comprising an extendable-retractable wire. The flight control cable sensor further comprises a first connector, co-movably fixed to the extendable-retractable wire, and a second connector, co-movably fixable to the flight control cable and configured to removably co-movably engage the first connector up to a predetermined pull-off force.

20 Claims, 10 Drawing Sheets

FLIGHT CONTROL CABLE SENSOR FOR AN AIRCRAFT

FIELD

This disclosure relates generally to aircraft, and more particularly to a flight control cable sensor for detecting actuation of a flight control cable of an aircraft.

BACKGROUND

Flight control cables are used to mechanically actuate flight control surfaces of aircraft. Sensors are used to detect actuation of flight control cables. Sensed conditions from the sensors can be used to determine the position of the flight control surfaces. Some sensors for detecting actuation of flight control cables can negatively affect operation of the flight control cables if the sensors become disabled.

SUMMARY

The subject matter of the present application has been developed in response to the present state of the art, and in particular, in response to the shortcomings of conventional sensors for sensing flight control cables that have not yet been fully solved by currently available techniques. Accordingly, the subject matter of the present application has been developed to provide a flight control cable sensor, and associated systems and methods, that overcome at least some of the above-discussed shortcomings of prior art flight control cable sensors.

Disclosed herein is a flight control cable sensor for detecting actuation of a flight control cable of an aircraft. The flight control cable sensor comprises a draw wire encoder, comprising an extendable-retractable wire. The flight control cable sensor further comprises a first connector, co-movably fixed to the extendable-retractable wire, and a second connector, co-movably fixable to the flight control cable and configured to removably co-movably engage the first connector up to a predetermined pull-off force. The preceding subject matter of this paragraph characterizes example 1 of the present disclosure.

One of the first connector or the second connector comprises a magnet. An other of the first connector or the second connector is made of a ferromagnetic material magnetically attracted to the magnet. Removable co-movable engagement between the first connector and the second connector comprises magnetic engagement between the magnet and the ferromagnetic material. The predetermined pull-off force corresponds with a maximum magnetic force between the magnet and the ferromagnetic material. The preceding subject matter of this paragraph characterizes example 2 of the present disclosure, wherein example 2 also includes the subject matter according to example 1, above.

The second connector comprises a receptacle. The first connector is matingly receivable within the receptacle to removably co-movably engage the first connector and the second connector. The preceding subject matter of this paragraph characterizes example 3 of the present disclosure, wherein example 3 also includes the subject matter according to example 2, above.

The magnet is within the receptacle of the second connector. The first connector is made of the ferromagnetic material magnetically attracted to the magnet. The preceding subject matter of this paragraph characterizes example 4 of the present disclosure, wherein example 4 also includes the subject matter according to example 3, above.

A portion of the second connector defining the receptacle is made of a second ferromagnetic material. The preceding subject matter of this paragraph characterizes example 5 of the present disclosure, wherein example 5 also includes the subject matter according to example 4, above.

The first connector comprises the magnet. The second connector is made of the ferromagnetic material magnetically attracted to the magnet. The preceding subject matter of this paragraph characterizes example 6 of the present disclosure, wherein example 6 also includes the subject matter according to example 3, above.

The first connector comprises a receptacle. The second connector is matingly receivable within the receptacle to removably co-movably engage the first connector and the second connector. The preceding subject matter of this paragraph characterizes example 7 of the present disclosure, wherein example 7 also includes the subject matter according to example 2, above.

The first connector comprises a first portion of a ball detent mechanism. The second connector comprises a second portion of the ball detent mechanism. Removable co-movable engagement between the first connector and the second connector comprises engagement between the first portion of the ball detent mechanism and the second portion of the ball detent mechanism. The predetermined pull-off force corresponds with a mechanical biasing force of the ball detent mechanism. The preceding subject matter of this paragraph characterizes example 8 of the present disclosure, wherein example 8 also includes the subject matter according to example 1, above.

The flight control sensor further comprises a carriage comprising a clamp, configured to non-movably fixedly clamp to the flight control cable, and the second connector. The second connector is coupled to the clamp. The preceding subject matter of this paragraph characterizes example 9 of the present disclosure, wherein example 9 also includes the subject matter according to any one of examples 1-8, above.

The draw wire encoder further comprises a spring-loaded reel about which a portion of the extendable-retractable wire is wound. The draw wire encoder also comprises a rotary encoder coupled to the spring-loaded reel and configured to detect extension and retraction of the extendable-retractable wire. The preceding subject matter of this paragraph characterizes example 10 of the present disclosure, wherein example 10 also includes the subject matter according to any one of examples 1-9, above.

Also disclosed herein is an aircraft. The aircraft comprises a flight control cable comprising a first end and a second end opposite the first end. The aircraft additional comprises a flight control surface coupled to the first end of the flight control cable and a flight controller coupled to the second end of the flight control cable. The flight controller is operable to actuate the flight control surface by actuating the flight control cable. The aircraft further comprises a flight control cable sensor that comprises a draw wire encoder comprising an extendable-retractable wire, a first connector co-movably fixed to the extendable-retractable wire, and a second connector co-movably fixed to the flight control cable and removably co-movably engaged with the first connector up to a predetermined pull-off force. The draw wire encoder is communicatively coupled with the flight controller to deliver a sensed position of the flight control cable to the flight controller. The flight controller is configured to determine a status of the flight control cable sensor based at least partially on the sensed position of the flight control cable received from the draw wire encoder. The preceding subject matter of this paragraph characterizes example 11 of the present disclosure.

The flight controller determines the status of the flight control cable sensor by comparing the sensed position of the flight control cable received from the draw wire encoder to an indication of a position of the flight control surface. The preceding subject matter of this paragraph characterizes example 12 of the present disclosure, wherein example 12 also includes the subject matter according to example 11, above.

The aircraft further comprises an auxiliary actuator coupled to the flight control surface and operable to actuate the flight control surface. The secondary indication of the position of the flight control surface comprises an output from the auxiliary actuator. The preceding subject matter of this paragraph characterizes example 13 of the present disclosure, wherein example 13 also includes the subject matter according to example 12, above.

The first connector comprises a first magnetic material. The second connector comprises a second magnetic material, magnetically attracted to the first magnetic material. Removable co-movable engagement between the first connector and the second connector comprises magnetic engagement between the first magnetic material and the second magnetic material. The predetermined pull-off force corresponds with a magnetic force between the first magnetic material and the second magnetic material. The preceding subject matter of this paragraph characterizes example 14 of the present disclosure, wherein example 14 also includes the subject matter according to any one of examples 11-13, above.

One of the first connector or the second connector comprises a receptacle. An other one of the first connector or the second connector is matingly received within the receptacle. An entirety of the receptacle is made of one of the first magnetic material or the second magnetic material. The preceding subject matter of this paragraph characterizes example 15 of the present disclosure, wherein example 15 also includes the subject matter according to example 14, above.

The second connector is co-movably fixed to the second end of the flight control cable. The preceding subject matter of this paragraph characterizes example 16 of the present disclosure, wherein example 16 also includes the subject matter according to any one of examples 11-15, above.

Additionally disclosed herein is a method of detecting actuation of a flight control cable of an aircraft. The method includes removably co-movably engaging a first connector, co-movably fixed to an extendable-retractable wire of a draw wire encoder, to a second connector, co-movably fixed to the flight control cable, up to a predetermined pull-off force. The method also includes co-moving the extendable-retractable wire and the flight control cable when a pull-off force between the first connector and the second connector is below the predetermined pull-off force. The method further includes disengaging the first connector from the second connector and moving the flight control cable relative to the extendable-retractable wire when the pull-off force between the first connector and the second connector is above the predetermined pull-off force. The preceding subject matter of this paragraph characterizes example 17 of the present disclosure.

The draw wire encoder further comprises a spring-loaded reel about which a portion of the extendable-retractable wire is wound. The draw wire encoder additionally comprises a rotary encoder coupled to the spring-loaded reel and configured to detect extension and retraction of the extendable-retractable wire. The pull-off force between the first connector and the second connector is above the predetermined pull-off force in response to the extendable-retractable wire binding to the spring-loaded reel. The preceding subject matter of this paragraph characterizes example 18 of the present disclosure, wherein example 18 also includes the subject matter according to example 17, above.

The method also comprises determining a first position of a flight control surface, operably coupled to the flight control cable, in response to output from the draw wire encoder, determining a second position of the flight control surface, operably coupled to the flight control cable, independently of output from the draw wire encoder, and detecting disablement of the draw wire encoder based on a difference between the first position of the flight control surface and the second position of the flight control surface being greater than a predetermined threshold. The preceding subject matter of this paragraph characterizes example 19 of the present disclosure, wherein example 19 also includes the subject matter according to example 18, above.

Removably co-movably engaging the first connector to the second connector comprises magnetically coupling the first connector to the second connector. The preceding subject matter of this paragraph characterizes example 20 of the present disclosure, wherein example 20 also includes the subject matter according to any one of examples 17-19, above.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
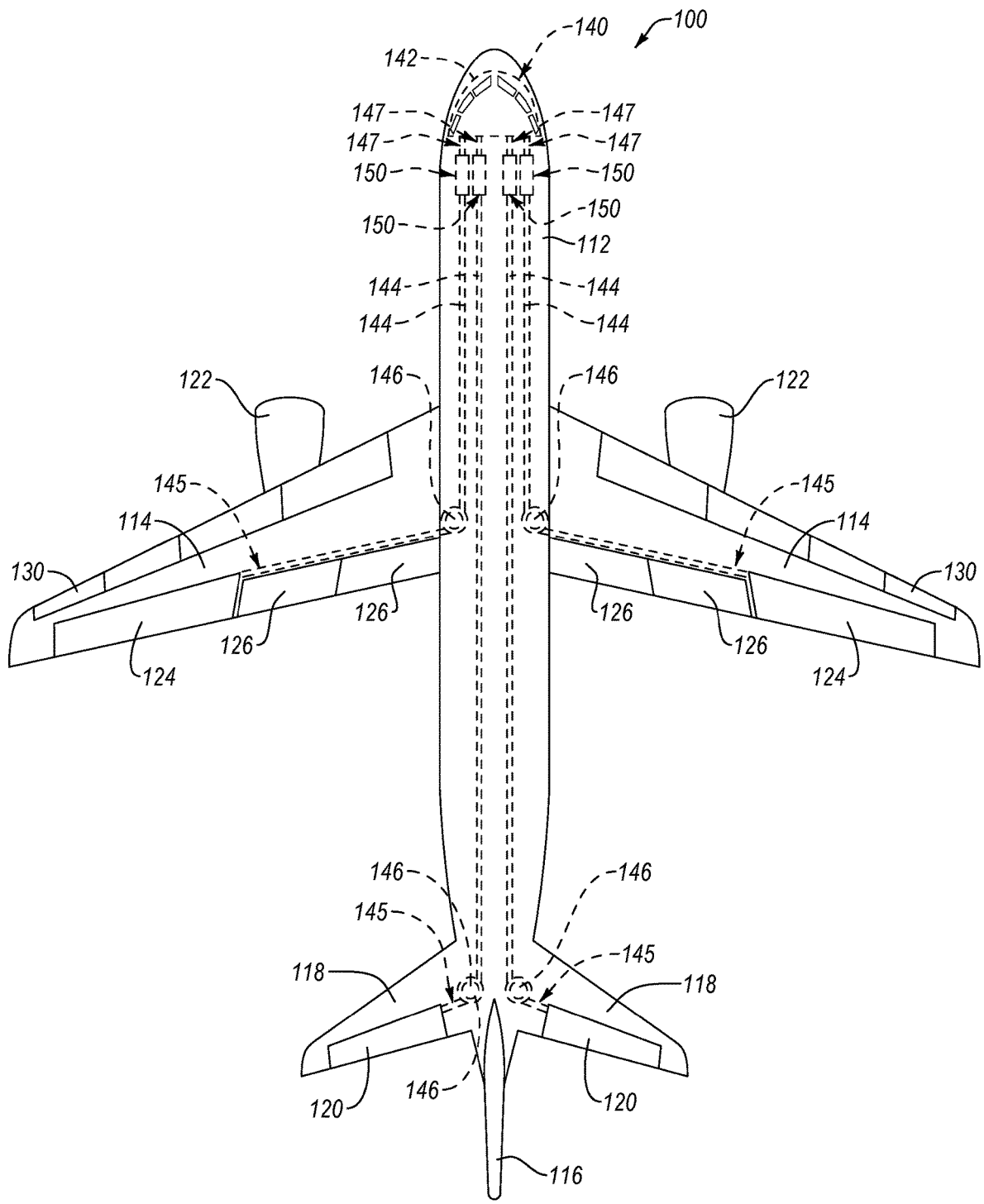
FIG. 1 is a top plan view of an aircraft, according to one or more examples of the present disclosure.

Referring to FIG. 1, one embodiment of an aircraft 100 is shown. The aircraft 100 can be any of various types of aircraft, such as commercial aircraft used for the transportation of passengers, military aircraft for military operations, personal aircraft, and the like. As depicted, the aircraft 100 represents a passenger airplane. The depicted aircraft 100 includes a body 112 (e.g., fuselage), a pair of wings 114 coupled to and extending from the body 112, a vertical stabilizer 116 coupled to the body 112, and a pair of horizontal stabilizers 118 coupled to the body 112 and/or the vertical stabilizer 116.

The aircraft 100 further includes a plurality of flight control surfaces, otherwise known as adjustable aerodynamic surfaces, which are adjustable to change the flight of the aircraft 100 by changing the characteristics of air flow over, around, and trailing the surfaces. For example, each wing 114, has coupled thereto, an aileron 124, flaps 126, spoilers (not shown), and slats 130. Additionally, the vertical stabilizer 116 includes a rudder (not shown), and each horizontal stabilizer 118 includes an elevator 120. For responsive control of the flight of the aircraft 100, the relative position of the flight control surfaces of the aircraft, such as those shown in FIG. 1, should be capable of precise adjustment.

The flight control surfaces are adjustable by mechanically actuating (e.g., pushing/pulling) flight control cables coupled to the flight control surfaces. For example, in the aircraft 100 of FIG. 1, each of the ailerons 124 and elevators 120 is operably coupled to a respective one of a plurality of flight control cables 144. Although not shown, other flight control surfaces of the aircraft 100 are also operably coupled to respective flight control cables.

Each flight control cable 144 has a first end 145 and a second end 147 that is opposite the first end 145. The first end 145 of each flight control cable 144 is directly coupled to a corresponding one of the flight control surfaces. The first ends 145 of the flight control cables 144 are coupled to respective flight control surfaces using a coupling technique that facilitates actuation of the flight control surfaces when the flight control cables 144 are pushed (e.g., extended) or pulled (e.g., retracted), such as in the directions indicated by directional arrows 170 of FIG. 2. The second ends 147 of the flight control cables 144 are directly coupled to a flight controller 142 of the aircraft 100. The second ends 147 are coupled to the flight controller 142 using a coupling technique that facilitates independent pushing or pulling of the flight control cables 144. The flight control cables 144 are made of a metallic material in some examples and are substantially tensilely non-elastic.

The flight controller 142 includes manual controls, in some examples, which are directly mechanically linked to the flight control cables 144. Manual controls include a pilot-operated control stick, among other manual control devices. Additionally, the flight controller 142 can include software-driven automatic controls, such as autopilot capability, which are electronically linked to the flight control cables 144 via auxiliary actuators, such as servo motors and the like. It is recognized that electronically-controlled actuation of the flight control surfaces via auxiliary actuators also causes a corresponding actuation of the flight control cables 144 because of the mechanical linkage between the flight control cables 144 and the flight control surfaces. To help route the flight control cables 144 from the flight controller 142 to the corresponding flight control surfaces, the aircraft 100 may include one or more pulleys 146 or other cable-routing mechanisms.

Figure 2:
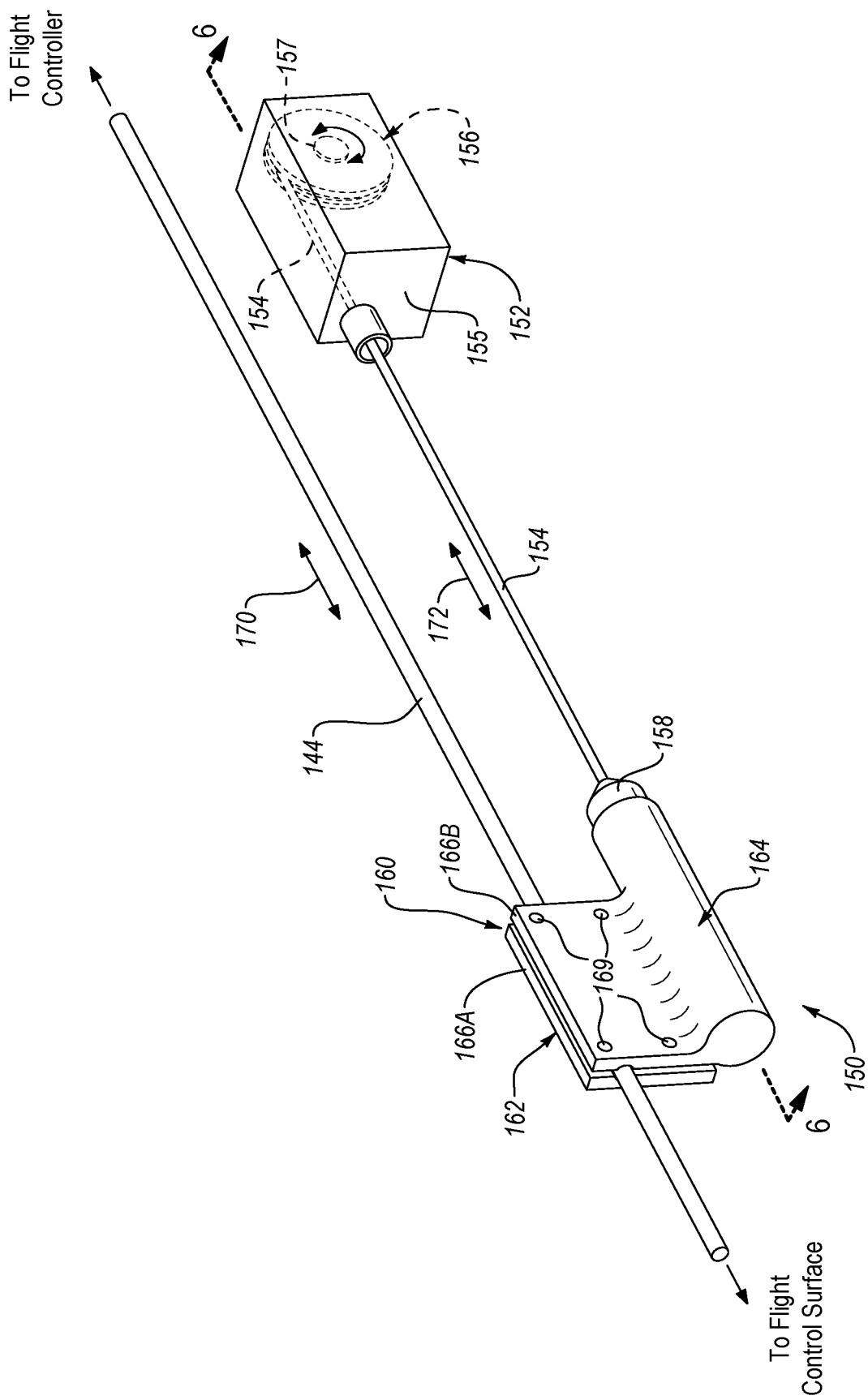
FIG. 2 is a perspective view of a flight control cable sensor, according to one or more examples of the present disclosure.
Figure 3:
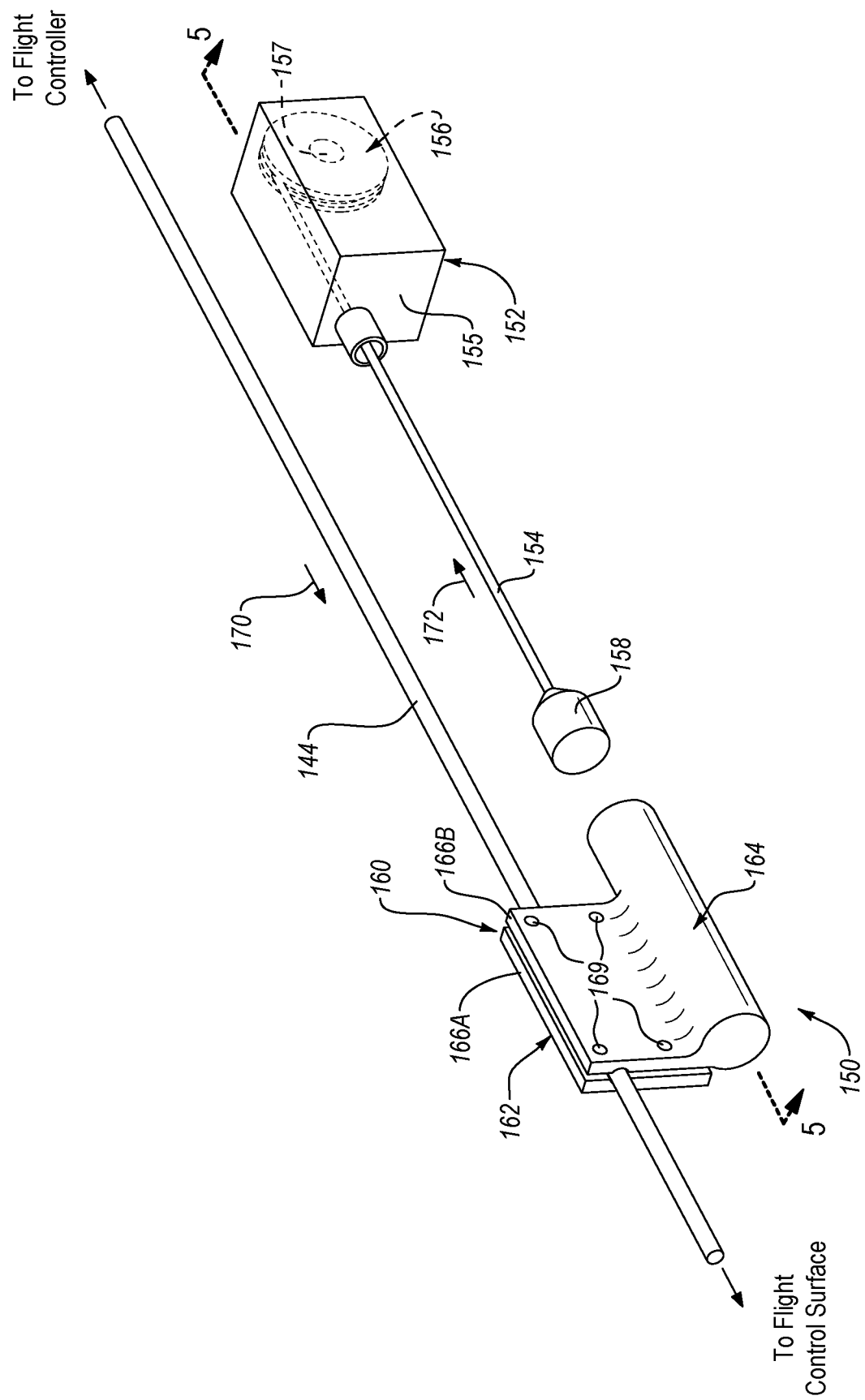
FIG. 3 is a perspective view of the flight control cable sensor of FIG. 2, shown with a first connector disengaged from a second connector, according to one or more examples of the present disclosure.
Figure 4:
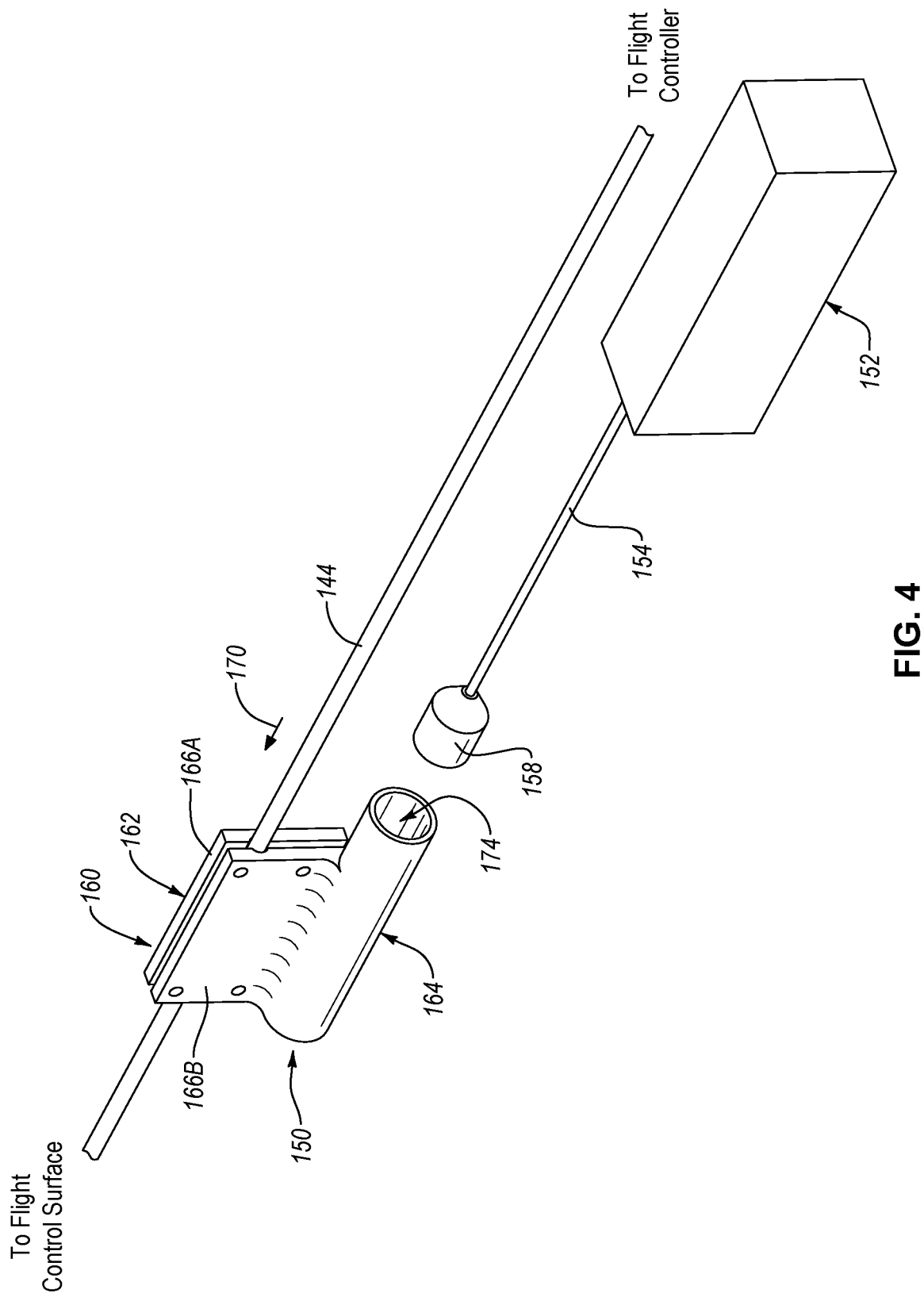
FIG. 4 is a perspective view of a flight control cable sensor, according to one or more examples of the present disclosure.

The aircraft 100 further includes a plurality of flight control cable sensors 150 each configured to detect (e.g., monitor) actuation of a corresponding flight control cable 144. In one example, the flight control cable sensors 150 are coupled to the second ends 147 of the flight control cables 144. Coupling the flight control cable sensors 150 to the second ends 147 promotes accuracy in detecting actuation of the flight control cables 144 because any stretch in the flight control cables 144 is less at the second ends 147 of the flight control cables 144 than at the first ends 145 of the flight control cables 144. Due to the mechanical linkage and co-movement between the flight control cables 144 and corresponding flight control surfaces, detection of actuation of the flight control cables 144 also indirectly detects actuation of the flight control surfaces. Referring to FIGS. 2-4, according to some examples, each flight control cable sensor 150 includes a draw wire encoder 152, a first connector 158, and a second connector 164.

The draw wire encoder 152 includes an extendable-retractable wire 154 that extends from and retracts into a housing 155 of the draw wire encoder 152. The extendable-retractable wire 154 can be made of a metallic material and have a construction that makes the extendable-retractable wire 154 substantially tensilely non-elastic. The draw wire encoder 152 further includes a spring-loaded reel 156 about which a portion of the extendable-retractable wire 154 is wound. Although not shown, a spring, or other biasing mechanism, biases the spring-loaded reel 156 to retract the extendable-retractable wire 154 into the housing 155 and wind the extendable-retractable wire 154 onto the spring-loaded reel 156. As the extendable-retractable wire 154 is wound onto the spring-loaded reel 156, the spring-loaded reel 156 rotates a first rotational direction. In contrast, when a force, greater than the bias of the biasing mechanism, acts on the extendable-retractable wire 154, the extendable-retractable wire 154 is extended from the housing 155 and unwound from the spring-loaded reel 156, which causes the spring-loaded reel 156 to rotate in a second rotational direction, opposite the first rotational direction. In this manner, rotation of the spring-loaded reel 156 is proportional to amount of extension or retraction of the extendable-retractable wire 154. The draw wire encoder 152 promotes a simple, fairly reliable, method of detecting the actuation of the flight control wire 144 through primarily mechanical means. However, under some circumstances, the extendable-retractable wire 154 is prone to binding to itself on the spring-loaded reel 156, which prevents rotation of the spring-loaded reel 156 and extension and retraction of the extendable-retractable wire 154.

The draw wire encoder 152 also includes a rotary encoder 157 coupled to the spring-loaded reel 156. The rotary encoder 157 is configured to detect extension and retraction of the extendable-retractable wire 154 by sensing the rotation of the spring-loaded reel 156. The rotary encoder 157 is also configured to output a detected actuation of the extendable-retractable wire 154, whether as raw reel rotation data or wire actuation data (converted from raw reel rotation data), to the flight controller 142.

The first connector 158 of the flight control cable sensor 150 is co-movably fixed to an end of the extendable-retractable wire 154. Accordingly, extension of the extendable-retractable wire 154 from the housing 155 results in the first connector 158 moving away from the housing 155. In contrast, retraction of the extendable-retractable wire 154 into the housing 155 results in the first connector 158 moving toward the housing 155. In the same manner, pulling or pushing the first connector 158 causes the extendable-retractable wire 154 to extend or retract, respectively.

The second connector 164 of the flight control cable sensor 150 is co-movably fixed to the flight control cable 144. Accordingly, movement of the flight control cable 144, such as to actuate a flight control surface, causes the second connector 164 to move in the same manner, such as in the directions indicated by directional arrows 172 of FIG. 2. In one example, the second connector 164 is co-movably fixed to the flight control cable 144 by a clamp 162. The second connector 164 and the clamp 162 together form a carriage 160. The clamp 162 is non-movably fixedly clamped to the flight control cable 144 at the second end of the flight control cable 144. According to one implementation, the clamp 162 includes a first half 166A (e.g., first clamp plate) and a second half 166B (e.g., second clamp plate) secured together by a plurality of fasteners 169. With the flight control cable 144 between the first half 166A and the second half 166B, the first half 166A and the second half 166B can be tightened together via the fasteners 169 to non-movably fixedly clamp the flight control cable 144 between the first half 166A and the second half 166B. The first half 166A and the second half 166B can include grooves for partially receiving and retaining the flight control cable 144 during and after tightening the halves together. The clamp 162 promotes a secure, non-movable, coupling of the second connector 164 and the flight control cable 144.

The second connector 164 is coupled to the clamp 162. More specifically, the second connector 164 is coupled to the second half 166B of the clamp 162. In one implementation, the second connector 164 is co-formed (e.g., cast, forged, machined, etc.) with the second half 166B of the clamp 162 and forms a one-piece unitary monolithic construction with the second half 166B. Alternatively, the second connector 164 is separately formed from and attached to the second half 166B of the clamp 162.

The first connector 158 and the second connector 164 of the flight control cable sensor 150 are configured to be removably co-movably engaged to each other up to a predetermined pull-off force. In other words, when acted upon by a pull-off force less than the predetermined pull-off force, the first connector 158 and the second connector 164 of the flight control cable sensor 150 remain removably co-movably engaged (see, e.g., FIG. 2). However, when acted upon by a pull-off force more than the predetermined pull-off force, the first connector 158 and the second connector 164 of the flight control cable sensor 150 disengage from each other (see, e.g., FIGS. 3 and 4). In this manner, the connection between the first connector 158 and the second connector 164 can be considered a frangible connection. Removable co-movable engagement promotes continued proper actuation of the flight control cable 144 and corresponding flight control surface even if the extendable-retractable wire 154 binds on the spring-loaded reel 156. Without removable co-movable engagement between the first connector 158 and the second connector 164, binding of the extendable-retractable wire 154 on the spring-loaded reel 156, or other malfunction of the draw wire encoder, would prevent actuation or stop actuation of the flight control cable 144. According to certain examples, the predetermined pull-off force is less than a force sufficient to deform (plastically or elastically) the first connector 158 and the second connector 164, except for biasing mechanisms, such as the springs of a detent mechanism, configured to deform at the predetermined pull-off force.

In some examples illustrated in FIGS. 2-11, the removable co-movable engagement between the first connector 158 and the second connector 164 is facilitated by the use of magnets and magnetic force. Generally, either of the first connector 158 and the second connector 164 includes a magnet and the other of the first connector 158 and the second connector 164 includes a ferromagnetic material attracted to the magnet. Accordingly, removable co-movable engagement between the first connector 158 and the second connector 164 includes magnetic attraction and engagement between the magnet and the ferromagnetic material. The predetermined pull-off force corresponds with a maximum magnetic force between the magnet and the ferromagnetic material. Accordingly, the first connector 158 and the second connector 164 remain co-movably engaged until a pull-off force between the connectors exceeds the maximum magnetic force between the connectors, at which time the second connector 164 disengages (e.g., separates) from the first connector 158.

Referring to FIGS. 4-8, in some examples, the second connector 164 includes a receptacle 174. The receptacle 174 can be defined between a sidewall of the second connector 164 having an annular shape. Accordingly, the receptacle 174 can have an enclosed cross-sectional shape, which corresponds to the cross-sectional shape of the first connector 158. Although the cross-sectional shape of the receptacle 174 and the first connector 158 in the illustrated examples is round, in other examples, cross-sectional shapes other than round can be used. The receptacle 174 is configured to matingly or nestably receive the first connector 158. The receptacle 174 helps to prevent lateral movement of the first connector 158 relative to the second connector 164. Moreover, as explained in more detail below, the receptacle 174 can help to concentrate magnetic flux between the first connector 158 and the second connector 164, which improves the magnetic attraction between the first connector 158 and the second connector 164, improves magnetic efficiency, and promotes the use of smaller, less-expensive magnets. However, in some examples, neither the first connector 158 nor the second connector 164 of the flight control cable sensor 150 disclosed in the present disclosure includes a receptacle, such that engagement between the first connector 158 and the second connector 164 is via only distal ends of the first connector 158 and the second connector 164.

Figure 5:
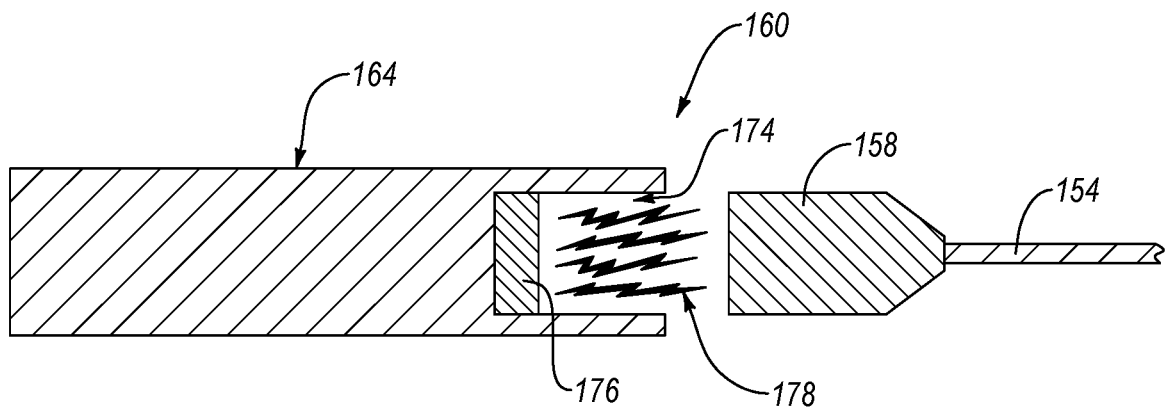
FIG. 5 is a cross-sectional side elevation view of the first connector and the second connector of the flight control cable sensor of FIG. 2, taken along the line 5-5 of FIG. 2, according to one or more examples of the present disclosure.
Figure 6:
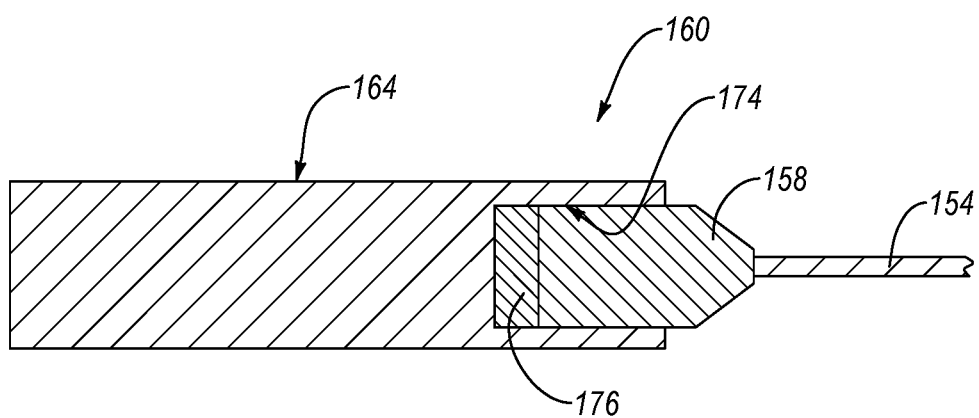
FIG. 6 is a cross-sectional side elevation view of the first connector and the second connector of the flight control cable sensor of FIG. 3, taken along the line 6-6 of FIG. 3, according to one or more examples of the present disclosure.

In a first example shown in FIGS. 5 and 6, the second connector 164 includes a magnet 176 within the receptacle 174. The magnet 176 is made of a ferromagnetic material that has been permanently magnetized. The magnet 176 can have a cross-sectional shape that complements the cross-sectional shape of the receptacle 174. Accordingly, the magnet 176 is nestably seated within the receptacle 174 in certain implementations. The first connector 158 is made of a ferromagnetic material that is magnetically attracted to the magnet 176 as indicated by magnetic attraction lines 178. When the first connector 158 is matingly received within the receptacle 174 of the second connector 164, the magnetic field of the magnet 176 temporarily magnetizes the first connector 158 to magnetically retain the first connector 158 against the magnet 176 and within the receptacle 174 with a maximum magnetic force. The maximum magnetic force can be predetermined or preselected based on the known magnetic properties of the magnet 176 (e.g., in view of the type of ferromagnetic material, the size of the magnet, the shape of the magnet, etc.) and the known ferromagnetic properties of the first connector 158. Although not shown, in some implementations, the entirety of the second connector 164 is a permanent magnet, such that the magnet 176 makes up the entirety of the second connector 164. Additionally, although not shown, in certain implementations, the first connector 158 can include a second magnet that is oriented to be magnetically attracted to the magnet 176.

The second connector 164, including the portion of the second connector 164 defining the receptacle 174, is made of a non-ferromagnetic material in certain examples. However, to help concentrate magnetic flux between the first connector 158 and the second connector 164 and improve the magnetic coupling between the first connector 158 and the second connector 164, at least the portion of the second connector 164 defining the receptacle 174 can be made of a second ferromagnetic material in some examples. The ferromagnetic properties of the material of the second connector 164 surrounding the receptacle 174 promote retention of the magnetic flux of the magnet 176 within the receptacle 174, which results in a concentration of the magnetic flux. The second ferromagnetic material of the second connector 164 can be the same as or different than the ferromagnetic material of the first connector 158.

Figure 7:
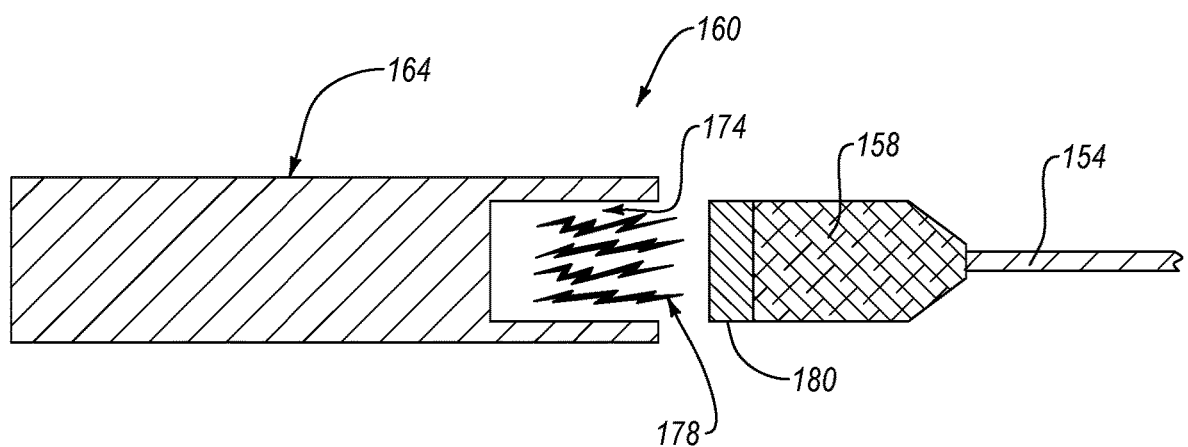
FIG. 7 is a cross-sectional side elevation view of the first connector and the second connector of a flight control cable sensor, taken along a line similar to the line 5-5 of FIG. 2, according to one or more examples of the present disclosure.
Figure 8:
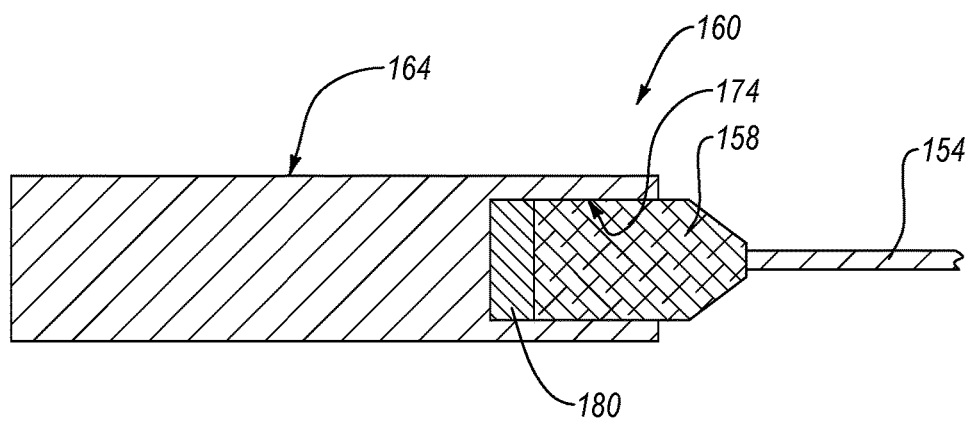
FIG. 8 is a cross-sectional side elevation view of the first connector and the second connector of a flight control cable sensor, taken along a line similar to the line 6-6 of FIG. 3, according to one or more examples of the present disclosure.

Referring to FIGS. 7 and 8, a second example of the first connector 158 and the second connector 164 is shown. Similar to the first example of FIGS. 5 and 6, the second connector 164 includes the receptacle 174. However, unlike the first example of FIGS. 5 and 6, the receptacle 174 does not include the magnet 176. Rather, in the second example of FIGS. 7 and 8, the first connector 158 includes a magnet 180. The magnet 180 can be the same as or similar to the magnet 176, with like magnetic and geometric properties.

The second connector 164 in this second example, at least at the base of the receptacle 174, is made of a ferromagnetic material that is magnetically attracted to the magnet 180 as indicated by magnetic attraction lines 178. When the first connector 158 is matingly received within the receptacle 174 of the second connector 164, the magnetic field of the magnet 180 temporarily magnetizes the second connector 164 to magnetically retain the second connector 164 against the magnet 180 and correspondingly retain the first connector 158 within the receptacle 174 with a maximum magnetic force. Although portions of the second connector 164, other than at the base of the receptacle 174, can be made of a non-ferromagnetic material, as described above, to help concentrate magnetic flux between the first connector 158 and the second connector 164 and improve the magnetic coupling between the first connector 158 and the second connector 164, at least the portion of the second connector 164 defining the side of the receptacle 174 can be made of a ferromagnetic material, such as the same ferromagnetic material as at the base of the receptacle 174. In this second example, the portion of the first connector 158 to which the magnet 180 is attached can be made of a ferromagnetic material or a non-ferromagnetic material. Making the portion of the first connector 158 to which the magnet 180 is attached out of a ferromagnetic material can improve the magnetic coupling between the first connector 158 and the second connector 164. Although not shown, in some implementations, the entirety of the first connector 158 is a permanent magnet, such that the magnet 180 makes up the entirety of the first connector 158. Additionally, although not shown, in certain implementations, the second connector 164 can include a second magnet, within the receptacle 174, which is oriented to be magnetically attracted to the magnet 180.

Figure 9:
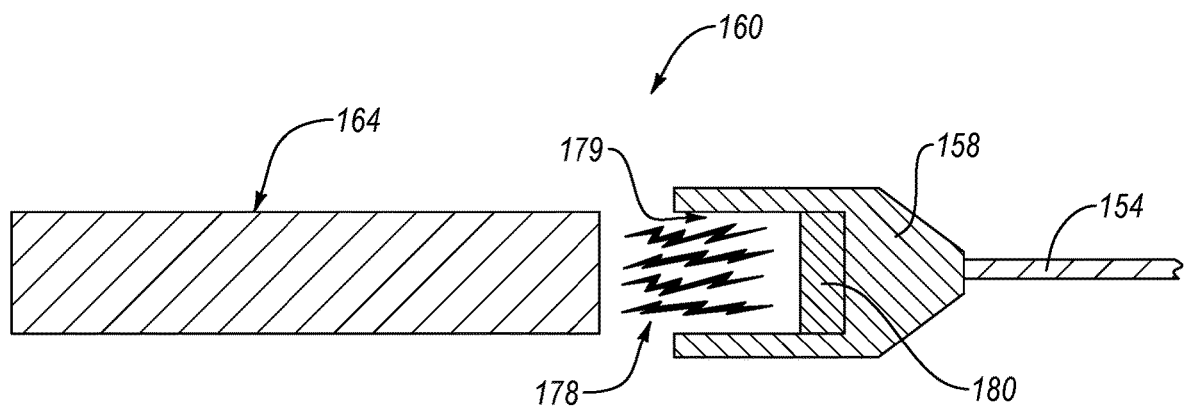
FIG. 9 is a cross-sectional side elevation view of the first connector and the second connector of a flight control cable sensor, taken along a line similar to the line 5-5 of FIG. 2, according to one or more examples of the present disclosure.
Figure 10:
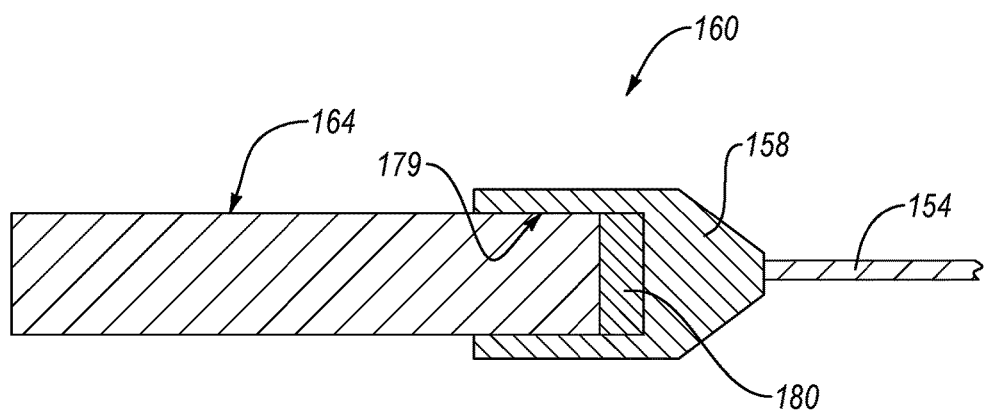
FIG. 10 is a cross-sectional side elevation view of the first connector and the second connector of a flight control cable sensor, taken along a line similar to the line 6-6 of FIG. 3, according to one or more examples of the present disclosure.
Figure 11:
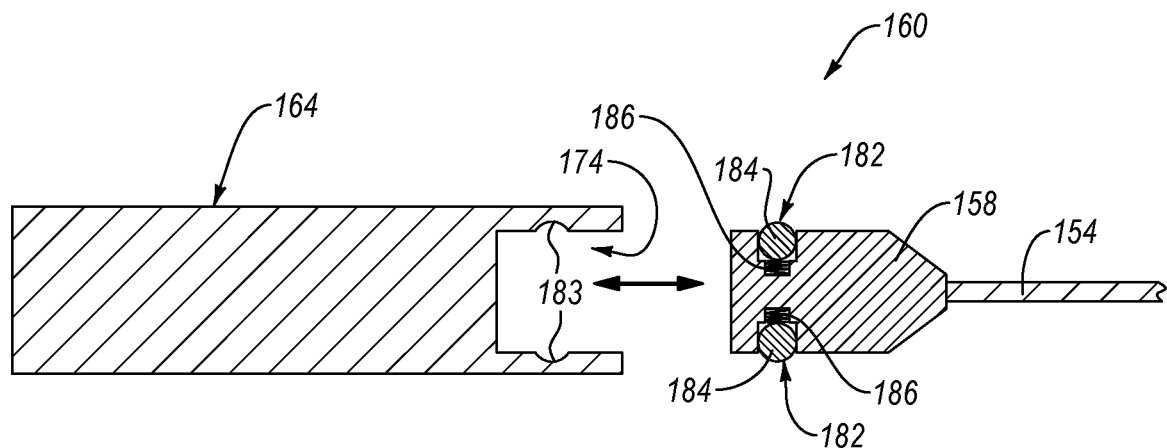
FIG. 11 is a cross-sectional side elevation view of the first connector and the second connector of a flight control cable sensor, taken along a line similar to the line 5-5 of FIG. 2, according to one or more examples of the present disclosure.

Referring to FIGS. 9 and 10, a third example of the first connector 158 and the second connector 164 is shown. In contrast to the first example of FIGS. 5 and 6 and the second examples of FIGS. 7 and 8, the first connector 148 includes a receptacle 179, instead of the second connector 164. In the illustrated implementation, the first connector 158 includes the magnet 180, which is matingly received (e.g., nestably seated) within the receptacle 179 of the first connector 148. The second connector 164 is matingly received within the receptacle 179 of the first connector 158. When the second connector 164 is matingly received within the receptacle 179 of the first connector 158, the magnetic field of the magnet 180 temporarily magnetizes the ferromagnetic material of the second connector 164 to magnetically retain the second connector 164 against the magnet 180 and within the receptacle 179 with a maximum magnetic force. To help concentrate magnetic flux between the first connector 158 and the second connector 164 and improve the magnetic coupling between the first connector 158 and the second connector 164, at least the portion of the first connector 158 defining the receptacle 179 can be made of a ferromagnetic material. Although not shown, in some implementations, the entirety of the first connector 158 is a permanent magnet, such that the magnet 180 makes up the entirety of the first connector 158. Additionally, although not shown, in certain implementations, the second connector 164 can include a magnet instead of the first connector 158 or the second connector 164 can include a second magnet, in addition to the magnet 180, that is oriented to be magnetically attracted to the magnet 180.

Figure 12:
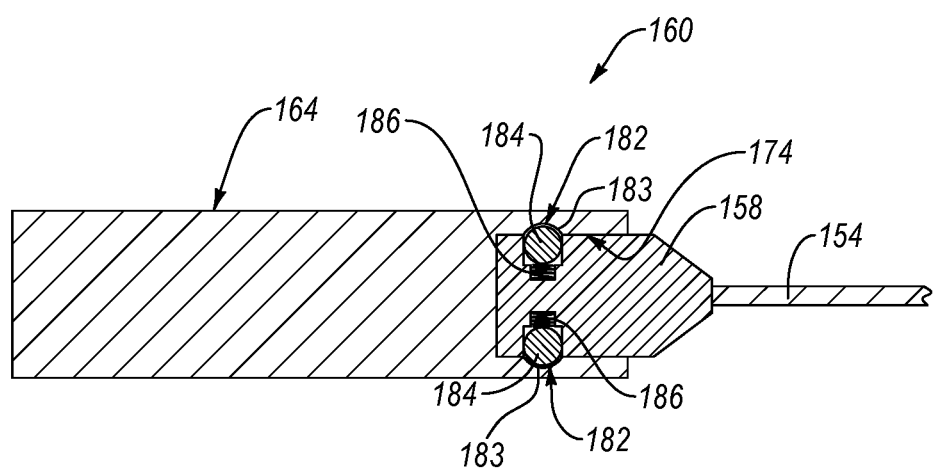
FIG. 12 is a cross-sectional side elevation view of the first connector and the second connector of a flight control cable sensor, taken along a line similar to the line 6-6 of FIG. 3, according to one or more examples of the present disclosure.

In some examples, the first connector 158 and the second connector 164 are removably co-movably engaged by a mechanical force instead of a magnetic force. For example, referring to FIGS. 11 and 12, the first connector 158 and the second connector 164 are removably co-movably engaged by a ball detent mechanism 181. The ball detent mechanism 181 includes a first portion 182 and a second portion 183. The first portion 182 is removably engaged with the second portion 183 and remains engaged up to a predetermined pull-off force corresponding with a mechanical biasing force of the ball detent mechanism 181. After the predetermined pull-off force is reached, the first portion 182 disengages with the second portion 183 and the first connector 158 disengages with the second connector 164. It is recognized that other types of detent mechanisms could be used instead of or in addition to a ball detent mechanism.

In the illustrated example, the first connector 158 includes the first portion 182 and the second connector 164 includes the second portion 183. However, in other examples, the first connector 158 includes the second portion 183 and the second connector 164 includes the first portion 182. The first portion 182 includes at least one ball 184 and a biasing mechanism 186 (e.g., spring) for each ball 184. The biasing mechanism 186 is configured to bias the corresponding ball 184 in a radially outward direction relative to a central axis of the first connector 158. Each ball 184 is retained within a corresponding first socket. The second portion 183 includes at least one second socket configured to receive a corresponding one of the balls 184 of the first portion 182. In the illustrated example, the second socket is formed in the receptacle 174 of the second connector 164. The second sockets of the second portion 183 are spatially aligned with the balls 184 of the first portion 182.

In the case of the illustrated example, as the first connector 158 is inserted into the receptacle 174 of the second connector 164, the wall of the receptacle 174 forces the balls 184 radially inwardly until the balls 184 are aligned with the second sockets of the second portion 183, at which time the biasing mechanism 186 urges the balls 184 into engagement with corresponding sockets of the second portion 183. The balls 184 remain engages with the sockets of the second portion 183 until a pull-off force acting on the first connector 158 and the second connector 164 exceeds the combined biasing force of the biasing mechanisms 186, which equal the mechanical biasing force of the ball detent mechanism 181. The mechanical biasing force of the ball detent mechanism 181 can be predetermined or preselected by selecting biasing mechanisms 186 having known and desirable biasing forces. Although the second connector 164 includes the receptacle 174, in the illustrated example of FIGS. 11 and 12, in other examples, the first connector 158 can include the receptacle instead of the second connector 164, similar to FIGS. 9 and 10.

It is recognized that in certain environments or under operating conditions, removably co-movably engaging the first connector 158 and the second connector 164 using magnetic force is advantageous over mechanical force or using mechanical force is advantageous over magnetic force. For example, corrosion tends to negatively affect the performance of mechanical components than magnetic components. Accordingly, in environments particularly conducive to corrosion, removably co-movably engaging the first connector 158 and the second connector 164 using magnetic force may be preferable over mechanical force.

Figure 13:
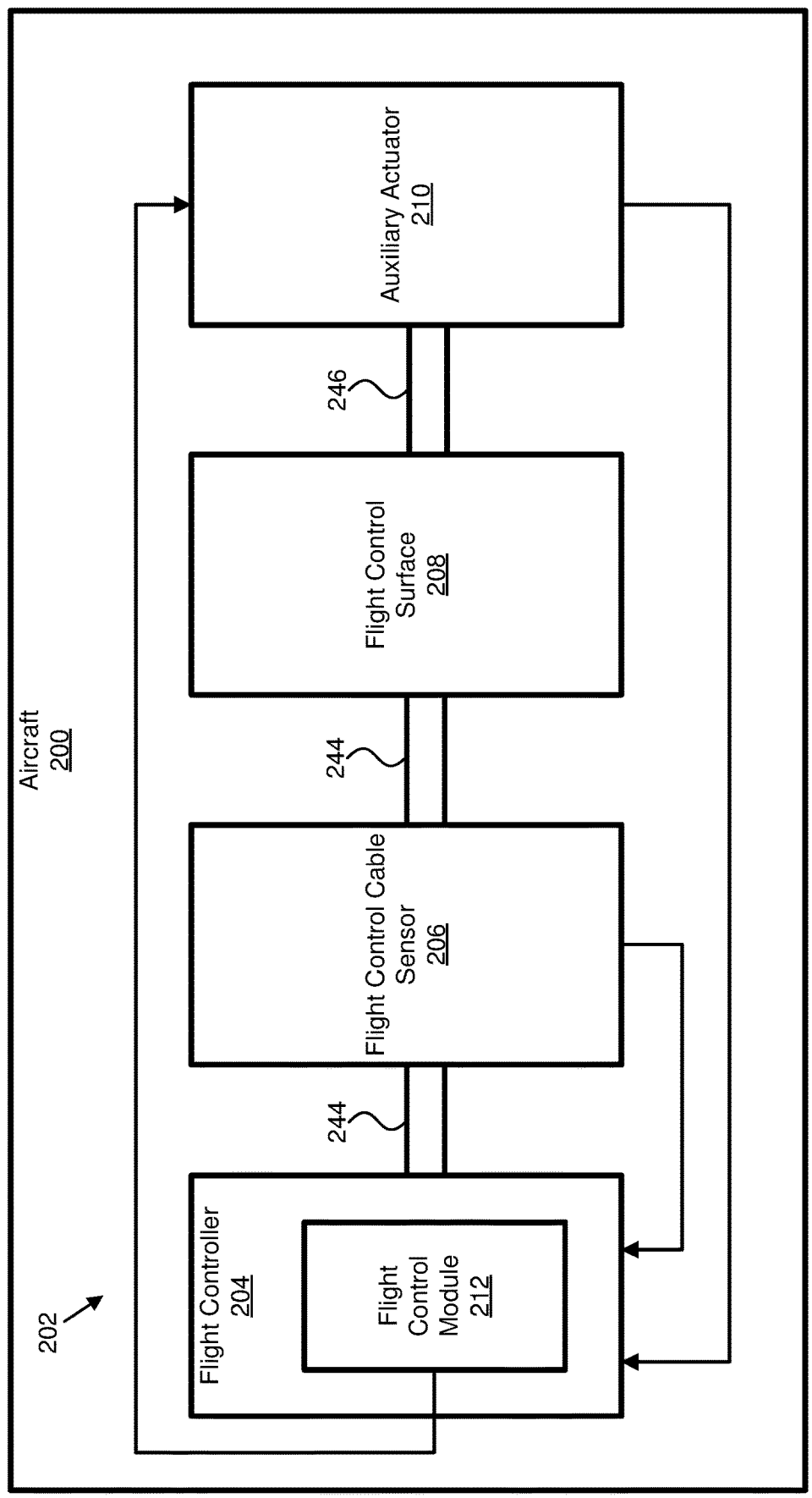
FIG. 13 is a schematic box diagram of an aircraft, according to one or more examples of the present disclosure.

Referring to FIG. 13, an aircraft 200 according to one example is shown. The aircraft 200 includes structural features similar to those described above in association with the aircraft 100 of FIG. 1. Additionally, the aircraft 100 includes a system 202 for controlling flight of the aircraft 200. The system 202 includes a flight controller 204, a flight control cable sensor 206, a flight control surface 208, and an auxiliary actuator 210.

The flight controller 204 controls flight characteristics of the aircraft 100 through manual and automatic techniques. In some examples, the flight controller 204 is the same as the flight controller 142 of the aircraft 100. The flight controller 204 includes a flight control module 212 that is configured to automatically control at least some aspects of the flight characteristics of the aircraft 100. For example, the flight control module 212 is configured to automatically control the auxiliary actuator 210, which can include a motor directly coupled to the flight control surface 208 by a mechanical coupler 246. The auxiliary actuator 210 further includes a position sensor, such as a rotary indicator, that detects a position of the auxiliary actuator 210 and communicates the detected position back to the flight control module 212 of the flight controller 204. In response to the detected position from the auxiliary actuator 210, the flight control module 212 of the flight controller 204 can determine a position of the flight control surface 208.

Manual control of the flight characteristics of the aircraft 100 by the flight controller 204 is facilitated by mechanical coupling of the flight controller 204 to the flight control surface 208 via a flight control cable 244, which can be configured similarly to, or the same as, the flight control cable 144. In other words, the flight controller is operable to actuate the flight control surface 208 by actuating the flight control cable 244. The flight control surface 208 can be any one of various flight control surfaces of an aircraft, such as the flight control surfaces shown and described in association with the aircraft 100.

Coupled to the flight control cable at a location between the flight controller 204 and the flight control surface 208 is the flight control cable sensor 206. The flight control cable sensor 206 is the same as the flight control cable sensor 150 of the aircraft 100 and is configured to detect actuation of the flight control cable 244 in the same way as the flight control cable sensor 150. The flight control cable sensor 206 can be coupled to a second end of the flight control cable 244, which is also coupled to the flight controller 204. In contrast, the flight control surface 208 is coupled to a first end of the flight control cable 244, which is opposite the second end. The flight control cable sensor 206, in particular a draw wire encoder of the flight control cable sensor 206, is communicatively coupled with the flight controller 204 to deliver a sensed or detected position of the flight control cable 244 to the flight control module 121 of the flight controller 204. In response to the sensed position of the flight control cable 244, the flight control module 121 can determine a position of the flight control surface 208.

Additionally, the flight control module 212 of the flight controller 204 is configured to determine a status of the flight control cable sensor 206 based at least partially on the sensed position of the flight control cable 244 received from the flight control cable sensor 206. The status of the flight control cable sensor 206 can be one of operable (or similar indicator) or disabled (or similar indicator). As described above, when an extendable-retractable wire of the flight control cable sensor 206 gets bound, to prevent rotation of the reel of a draw wire encoder of the flight control cable sensor 206, a first connector and a second connector of the flight control cable sensor 206 disengage. Disengagement between the first connector and the second connector of the flight control cable sensor 206 allows the flight control cable 244 to continue to properly actuate, but results in a sensed position of the flight control cable received from the flight control cable sensor 206 to be incongruent with the position of the flight control surface. When an incongruence is present, the flight control module 212 determines the status of the flight control cable sensor 206 is disabled. In contrast, when an incongruence is not present, the flight control module 212 determines the status of the flight control cable sensor 206 is operable. Therefore, according to one example, the flight control module 212 of the flight controller 204 detects the presence of an incongruence, and thus determines the status of the flight control cable sensor 206, by comparing the position of the flight control cable 244 received from the draw wire encoder to an indication of a position of the flight control surface 208. The indication of the position of the flight control surface 208 can be a mechanical indication, such as a gauge, directly coupled to the flight control cable 244. Alternatively, or additionally, the indication of the position of the flight control surface 208 can be obtained from an output of the auxiliary actuator 210.

Figure 14:
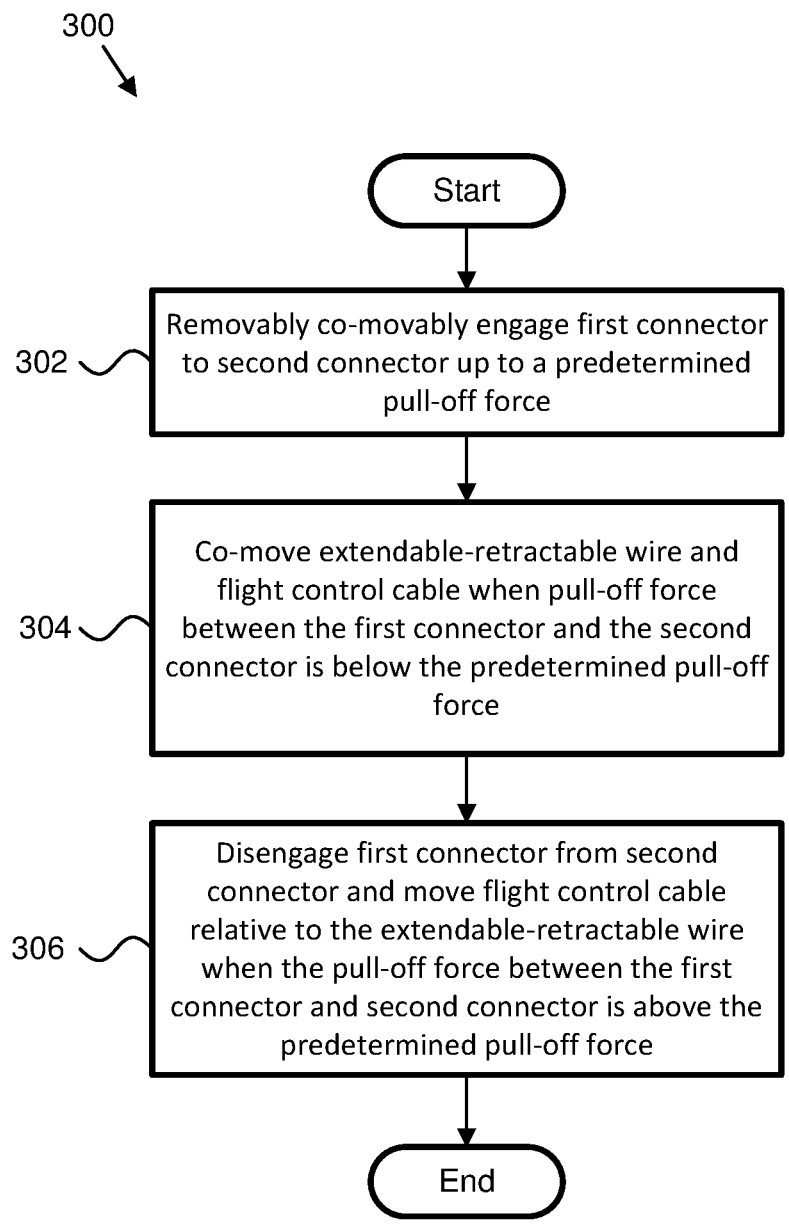
FIG. 14 is schematic flow chart of a method of detecting actuation of a flight control cable of an aircraft, according to one or more examples of the present disclosure.

Referring to FIG. 14, according to one example, a method 300 of detecting actuation of a flight control cable of an aircraft, such as the flight control cable 144 of the aircraft 100, includes removably co-movably engaging a first connector (e.g., first connector 158), which is co-movably fixed to an extendable-retractable wire (e.g., extendable-retractable wire 154) of a draw wire encoder (e.g., draw wire encoder 152), to a second connector (e.g., second connector 164), co-movably fixed to the flight control cable, up to a predetermined pull-off force at step 302. Removably co-movably engaging the first connector to the second connector includes magnetically coupling the first connector to the second connector. The method 300 additionally includes co-moving the extendable-retractable wire and the flight control cable when a pull-off force between the first connector and the second connector is below the predetermined pull-off force at 304. The method 300 further includes disengaging the first connector from the second connector and moving the flight control cable relative to the extendable-retractable wire when the pull-off force between the first connector and the second connector is above the predetermined pull-off force at step 306. Allowing the flight control cable to move relative to the extendable-retractable wire of the draw wire encoder enables the flight control cable to continue operating properly to move the flight control surface even when the extendable-retractable wire of the draw wire encoder binds. Accordingly, in some examples, the pull-off force between the first connector and the second connector is above the predetermined pull-off force in response to the extendable-retractable wire binding to the spring-loaded reel.

In certain examples, the method 300 further includes determining a first position of a flight control surface, operably coupled to the flight control cable, in response to output from the draw wire encoder, determining a second position of the flight control surface, operably coupled to the flight control cable, independently of output from the draw wire encoder, and detecting disablement of the draw wire encoder based on a difference between the first position of the flight control surface and the second position of the flight control surface being greater than a predetermined threshold.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The electronic controller and associated modules described in this specification may be implemented as a hardware circuit comprising custom VLSI circuits or gate arrays, off-the-shelf semiconductors such as logic chips, transistors, or other discrete components. The electronic controller may also be implemented in programmable hardware devices such as field programmable gate arrays, programmable array logic, programmable logic devices or the like.

The electronic controller may also be implemented in code and/or software for execution by various types of processors. An identified module of code may, for instance, comprise one or more physical or logical blocks of executable code which may, for instance, be organized as an object, procedure, or function. Nevertheless, the executables of the electronic controller need not be physically located together, but may comprise disparate instructions stored in different locations which, when joined logically together, comprise the electronic controller and achieve the stated purpose for the electronic controller.

Indeed, code of the electronic controller may be a single instruction, or many instructions, and may even be distributed over several different code segments, among different programs, and across several memory devices. Similarly, operational data may be identified and illustrated herein within the electronic controller, and may be embodied in any suitable form and organized within any suitable type of data structure. The operational data may be collected as a single data set, or may be distributed over different locations including over different computer readable storage devices. Where the electronic controller or portions of the electronic controller are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A flight control cable sensor for detecting actuation of a flight control cable of an aircraft, the flight control cable sensor comprising:
   a draw wire encoder, comprising an extendable-retractable wire;
   a first connector co-movably fixed to the extendable-retractable wire; and
   a second connector co-movably fixable to the flight control cable and configured to removably co-movably engage the first connector up to a predetermined pull-off force.

2. The flight control cable sensor according to claim 1, wherein:
   one of the first connector or the second connector comprises a magnet or;
   an other of the first connector or the second connector is made of a ferromagnetic material magnetically attracted to the magnet or;
   removable co-movable engagement between the first connector and the second connector comprises magnetic engagement between the magnet or and the ferromagnetic material; and
   the predetermined pull-off force corresponds with a maximum magnetic force between the magnet or and the ferromagnetic material.

3. The flight control cable sensor according to claim 2, wherein:
   the second connector comprises a receptacle; and
   the first connector is matingly receivable within the receptacle to removably co-movably engage the first connector and the second connector.

4. The flight control cable sensor according to claim 3, wherein:
   the magnet is within the receptacle of the second connector; and
   the first connector is made of the ferromagnetic material magnetically attracted to the magnet.

5. The flight control cable sensor according to claim 4, wherein a portion of the second connector defining the receptacle is made of a second ferromagnetic material.

6. The flight control cable sensor according to claim 3, wherein:
   the first connector comprises the magnet; and
   the second connector is made of the ferromagnetic material magnetically attracted to the magnet.

7. The flight control cable sensor according to claim 2, wherein:
   the first connector comprises a receptacle; and
   the second connector is matingly receivable within the receptacle to removably co-movably engage the first connector and the second connector.

8. The flight control cable sensor according to claim 1, wherein:
   the first connector comprises a first portion of a ball detent mechanism;
   the second connector comprises a second portion of the ball detent mechanism;
   removable co-movable engagement between the first connector and the second connector comprises engagement between the first portion of the ball detent mechanism and the second portion of the ball detent mechanism; and
   the predetermined pull-off force corresponds with a mechanical biasing force of the ball detent mechanism.

9. The flight control cable sensor according to claim 1, further comprising a carriage comprising:
   a clamp configured to non-movably fixedly clamp to the flight control cable; and
   the second connector;
   wherein the second connector is coupled to the clamp.

10. The flight control cable sensor according to claim 1, wherein the draw wire encoder further comprises:
    a spring-loaded reel about which a portion of the extendable-retractable wire is wound; and
    a rotary encoder coupled to the spring-loaded reel and configured to detect extension and retraction of the extendable-retractable wire.

11. An aircraft, comprising:
    a flight control cable comprising a first end and a second end opposite the first end;

a flight control surface coupled to the first end of the flight control cable;

a flight controller coupled to the second end of the flight control cable, wherein the flight controller is operable to actuate the flight control surface by actuating the flight control cable; and a flight control cable sensor, comprising:
- a draw wire encoder comprising an extendable-retractable wire;
- a first connector co-movably fixed to the extendable-retractable wire; and
- a second connector co-movably fixed to the flight control cable and removably co-movably engaged with the first connector up to a predetermined pull-off force;

wherein:
- the draw wire encoder is communicatively coupled with the flight controller to deliver a sensed position of the flight control cable to the flight controller; and
- the flight controller is configured to determine a status of the flight control cable sensor based at least partially on the sensed position of the flight control cable received from the draw wire encoder.

12. The aircraft according to claim 11, wherein the flight controller determines the status of the flight control cable sensor by comparing the sensed position of the flight control cable received from the draw wire encoder to an indication of a position of the flight control surface.

13. The aircraft according to claim 12, further comprising an auxiliary actuator coupled to the flight control surface and operable to actuate the flight control surface, wherein the secondary indication of the position of the flight control surface comprises an output from the auxiliary actuator.

14. The aircraft according to claim 11, wherein:
the first connector comprises a first magnetic material;
the second connector comprises a second magnetic material, magnetically attracted to the first magnetic material;
removable co-movable engagement between the first connector and the second connector comprises magnetic engagement between the first magnetic material and the second magnetic material; and
the predetermined pull-off force corresponds with a magnetic force between the first magnetic material and the second magnetic material.

15. The aircraft according to claim 14, wherein:
one of the first connector or the second connector comprises a receptacle;
an other one of the first connector or the second connector is matingly received within the receptacle; and
an entirety of the receptacle, is made of one of the first magnetic material or the second magnetic material.

16. The aircraft according to claim 11, wherein the second connector is co-movably fixed to the second end of the flight control cable.

17. A method of detecting actuation of a flight control cable of an aircraft, the method comprising:
removably co-movably engaging a first connector, co-movably fixed to an extendable-retractable wire of a draw wire encoder, to a second connector, co-movably fixed to the flight control cable, up to a predetermined pull-off force;
co-moving the extendable-retractable wire and the flight control cable when a pull-off force between the first connector and the second connector is below the predetermined pull-off force; and
disengaging the first connector from the second connector and moving the flight control cable relative to the extendable-retractable wire when the pull-off force between the first connector and the second connector is above the predetermined pull-off force.

18. The method according to claim 17, wherein:
the draw wire encoder further comprises:
- a spring-loaded reel about which a portion of the extendable-retractable wire is wound; and
- a rotary encoder coupled to the spring-loaded reel and configured to detect extension and retraction of the extendable-retractable wire; and
the pull-off force between the first connector and the second connector is above the predetermined pull-off force in response to the extendable-retractable wire binding to the spring-loaded reel.

19. The method according to claim 18, further comprising:
determining a first position of a flight control surface, operably coupled to the flight control cable, in response to output from the draw wire encoder;
determining a second position of the flight control surface, operably coupled to the flight control cable, independently of output from the draw wire encoder; and
detecting disablement of the draw wire encoder based on a difference between the first position of the flight control surface and the second position of the flight control surface being greater than a predetermined threshold.

20. The method according to claim 17, wherein removably co-movably engaging the first connector to the second connector comprises magnetically coupling the first connector to the second connector.

\* \* \* \* \*